(12) United States Patent
Owen

(10) Patent No.: US 10,230,958 B2
(45) Date of Patent: *Mar. 12, 2019

(54) AUDIO SPLITTING WITH CODEC-ENFORCED FRAME SIZES

(71) Applicant: DISH Technologies L.L.C., Englewood, CO (US)

(72) Inventor: Calvin Ryan Owen, Riverton, UT (US)

(73) Assignee: DISH TECHNOLOGIES LLC, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,136

(22) Filed: Apr. 12, 2018

(65) Prior Publication Data

US 2018/0234682 A1 Aug. 16, 2018

Related U.S. Application Data

(63) Continuation of application No. 15/429,634, filed on Feb. 10, 2017, now Pat. No. 9,961,349, which is a
(Continued)

(51) Int. Cl.
*G06F 3/16* (2006.01)
*H04N 7/52* (2011.01)
(Continued)

(52) U.S. Cl.
CPC ........... *H04N 19/147* (2014.11); *G06F 3/165* (2013.01); *G10L 19/167* (2013.01);
(Continued)

(58) Field of Classification Search
CPC ........... H04N 19/147; H04N 21/23406; H04N 21/2343; H04N 21/2662; H04N 21/8456; G06F 3/165; G10L 19/167; G10L 21/055
(Continued)

(56) References Cited

U.S. PATENT DOCUMENTS 6,081,299 A * 6/2000 Kesselring ....... H04N 21/23608
348/425.2
7,426,615 B2 * 9/2008 Kanota .............. G11B 20/1217
711/112
(Continued)

FOREIGN PATENT DOCUMENTS

| CN | 101529503 A | 9/2009 |
|---|---|---|
| EP | 1115252 A2 | 7/2001 |
| JP | 2005341061 A | 12/2005 |

OTHER PUBLICATIONS

Smooth Streaming Archtecture posted on Alex Zamelli's Streaming Media Blog [online] on Feb. 10, 2009 by Alex Zambelli. [retrieved Sep. 12, 2018]. Retrieved from Internet: <URL: http://alexzambelli.com/blog/2009/02/10/smooth-streaming-architecture/.pdf>.
(Continued)

*Primary Examiner* — On S Mung
(74) *Attorney, Agent, or Firm* — Lorenz & Kopf LLP

(57) ABSTRACT

A method and apparatus for splitting the audio of media content into separate content files without introducing boundary artifacts is described. A computing system for streaming media content including audio and video comprises a database to store a plurality of content files and a server coupled to the database to deliver the plurality of content files over one or more network connections. Each of the plurality of content files comprises an encoded portion of the video encoded according to a frame rate and having a fixed-time duration and an encoded portion of the audio encoded according to a codec-enforced frame size and having a plurality of full audio frames having the codec-enforced frame size. A duration of the encoded portion of the audio of one or more of the plurality of content files is greater than or less than the fixed-time duration.

20 Claims, 9 Drawing Sheets

Related U.S. Application Data continuation of application No. 15/139,838, filed on Apr. 27, 2016, now Pat. No. 9,601,126, which is a continuation of application No. 12/643,700, filed on Dec. 21, 2009, now Pat. No. 9,338,523.

(51) Int. Cl.

| | |
|---|---|
| *G10L 19/16* | (2013.01) |
| *H04L 29/06* | (2006.01) |
| *H04N 19/15* | (2014.01) |
| *G10L 21/055* | (2013.01) |
| *H04N 19/147* | (2014.01) |
| *H04N 19/172* | (2014.01) |
| *H04N 21/234* | (2011.01) |
| *H04N 21/236* | (2011.01) |
| *H04N 21/434* | (2011.01) |
| *H04N 21/845* | (2011.01) |
| *H04N 21/2343* | (2011.01) |
| *H04N 21/2662* | (2011.01) |

(52) U.S. Cl.
CPC ....... *G10L 21/055* (2013.01); *H04N 21/2343* (2013.01); *H04N 21/23406* (2013.01); *H04N 21/2662* (2013.01); *H04N 21/8456* (2013.01); *H04L 65/608* (2013.01); *H04N 7/52* (2013.01); *H04N 19/15* (2014.11); *H04N 19/172* (2014.11); *H04N 21/236* (2013.01); *H04N 21/434* (2013.01)

(58) Field of Classification Search
USPC ..................................... 375/240.26
See application file for complete search history.

(56) References Cited

U.S. PATENT DOCUMENTS

| | | | | |
|---|---|---|---|---|
| 2002/0001309 | A1* | 1/2002 | Saito | H04N 21/235 370/389 |
| 2005/0262257 | A1* | 11/2005 | Major | H04N 21/25808 709/231 |
| 2007/0093206 | A1* | 4/2007 | Desai | H04B 14/04 455/41.2 |
| 2007/0100607 | A1* | 5/2007 | Villemoes | G10L 19/022 704/207 |
| 2008/0084925 | A1* | 4/2008 | Rozen | H04N 19/176 375/240.01 |
| 2009/0257484 | A1* | 10/2009 | Liu | G11B 27/3027 375/240.01 |
| 2009/0288111 | A1* | 11/2009 | Park | H04N 7/173 725/28 |

OTHER PUBLICATIONS

Indian Patent and Trademark Office, First Examination Report in Indian Patent Application No. 5366/CHENP/2012 dated Oct. 10, 2018.

* cited by examiner

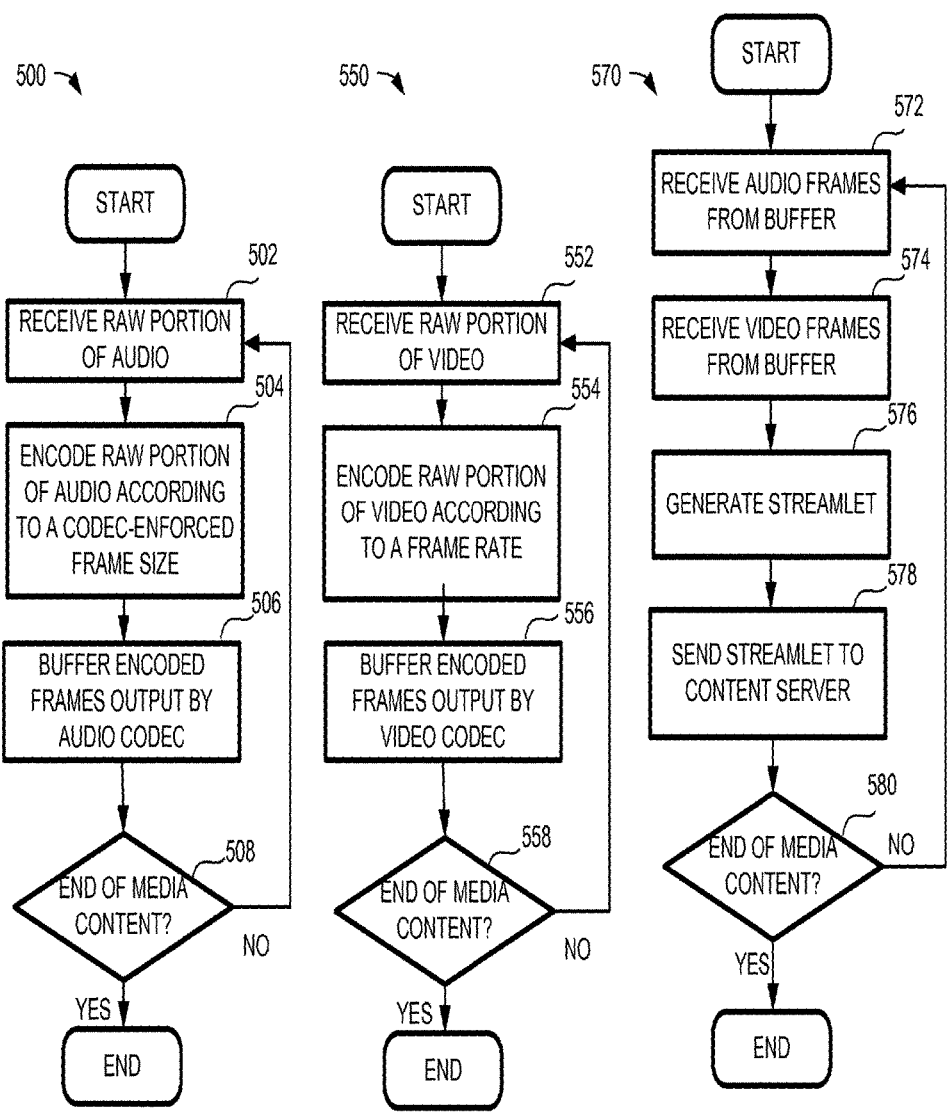

| AUDIO PORTION 1 _621_<br>OFFSET = 0 ms<br># OF FRAMES = 94<br># OF SAMPLES = 96256<br>DURATION = 2.0053 s | AUDIO PORTION 2 _622_<br>OFFSET = 5.33 ms<br># OF FRAMES = 94<br># OF SAMPLES = 96256<br>DURATION = 2.0053 s | AUDIO PORTION 3 _623_<br>OFFSET = 10.66 ms<br># OF FRAMES = 94<br># OF SAMPLES = 96256<br>DURATION = 2.0053 s | AUDIO PORTION 4 _624_<br>OFFSET = 16 ms<br># OF FRAMES = 93<br># OF SAMPLES = 95232<br>DURATION = 1.984 s |
|---|---|---|---|

| _611_<br>VIDEO PORTION 1<br># OF FRAMES = 60<br>DURATION = 2s | _612_<br>VIDEO<br># OF FRAMES = 60<br>DURATION = 2s | _613_<br>VIDEO<br># OF FRAMES = 60<br>DURATION = 2s | _614_<br>VIDEO<br># OF FRAMES = 60<br>DURATION = 2s |
|---|---|---|---|

| _601_<br>STREAMLET 1<br>VIDEO PORTION 1<br>AUDIO PORTION 1 | _602_<br>STREAMLET 2<br>VIDEO PORTION 2<br>AUDIO PORTION 2 | _603_<br>STREAMLET 3<br>VIDEO PORTION 3<br>AUDIO PORTION 3 | _604_<br>STREAMLET 4<br>VIDEO PORTION 4<br>AUDIO PORTION 4 |
|---|---|---|---|

FIG. 6A

AUDIO SPLITTING WITH CODEC-ENFORCED FRAME SIZES

CROSS-REFERENCE TO RELATED APPLICATIONS

This application is a continuation of U.S. patent application Ser. No. 15/429,634, filed Feb. 10, 2017, which is a continuation of U.S. patent application Ser. No. 15/139,838, filed Apr. 27, 2016, now U.S. Pat. No. 9,601,126, which is a continuation of U.S. patent application Ser. No. 12/643,700, filed Dec. 21, 2009, now U.S. Pat. No. 9,338,523.

TECHNICAL FIELD

Embodiments of the invention relate to the field of delivery of media content over the Internet; and more specifically, to splitting the audio of media content into separate content files without introducing boundary artifacts.

BACKGROUND

The Internet is becoming a primary method for distributing media content (e.g., video and audio or audio) and other information to end users. It is currently possible to download music, video, games, and other media information to computers, cell phones, and virtually any network capable device. The percentage of people accessing the Internet for media content is growing rapidly. The quality of the viewer experience is a key barrier to the growth of video viewing on-line. Consumer expectations for online video are set by their television and movie viewing experiences.

Audience numbers for streaming video on the web are rapidly growing, and there are a growing interest and demand for viewing video on the Internet. Streaming of data files or "streaming media" refers to technology that delivers sequential media content at a rate sufficient to present the media to a user at the originally anticipated playback speed without significant interruption. Unlike downloaded data of a media file, streamed data may be stored in memory until the data is played back and then subsequently deleted after a specified amount of time has passed.

Streaming media content over the Internet has some challenges, as compared to regular broadcasts over the air, satellite, or cable. One concern that arises in the context of encoding audio of the media content is the introduction of boundary artifacts when segmenting the video and audio into fixed-time portions. In one conventional approach, the audio is segmented into portions having a fixed-time duration that matches the fixed-time duration of the corresponding video, for example, two seconds. In this approach, the audio boundaries always align with the video boundaries. The conventional approach starts a new encode session of an audio codec to encode each audio portion for each content file, for example, using Low Complexity Advanced Audio Coding (AAC LC). By using a new encode session for each portion of audio, the audio codec interprets the beginning and end of the waveform as transitions from zero, resulting in a pop or click noise in the playback of the encoded portion at the portion boundaries, such as illustrated in FIG. 1. The pop or click noises are referred to as boundary artifacts. Also, the audio codec encodes the audio of the fixed-time duration according to a codec-enforced frame size. This also introduces boundary artifacts when the number of samples produced by the audio codec is not evenly divisible by the codec-enforced frame size.

FIG. 1 is a diagram illustrating an exemplary audio waveform 100 for two portions of audio using a conventional approach. The audio waveform 100 illustrates the transition from zero 102 between the first and second portions of video. When the audio codec has a fixed-frame size (referred to herein as a codec-enforced frame size), the audio coded requires that the last frame 104 be padded with zeros when the number of samples of the portion is not evenly divisible by the number of samples per frame according to the codec-enforced frame size. For example, when using a sampling rate of 48 kHz, there are 96,000 samples generated for an audio segment of two seconds. When dividing the number of samples, 96,000, by the number of samples per frame (e.g., 1024 samples for AAC LC and 2048 samples High Efficiency AAC (HE AAC)), the result is 93.75 frames. Since the number 93.75 is not an integer, the audio codec pads the last frame 104 with zeros. In this example, the last 256 samples of the last frame are given a zero value. Although the zero values represents silent audio, the padding of the last frame with zeros results in a pop or click noise during playback of the encoded portion of audio at the portion boundaries. The transitions from zero 102 and the padded zeros in the last frame 104 introduce boundary artifacts. The introduction of boundary artifacts can decrease the overall quality of the audio, affecting the user's experience during playback of the media content.

Another conventional approach attempts to limit the number of boundary artifacts by using portions of audio having a longer duration in order to align with frame boundaries. However, by using a larger duration portion for the audio, the audio and video may be required to be packaged separately. This may present a drawback for streaming media content having audio and video, especially when the same media content is encoded at different quality levels, for example, as used in the context of adaptive streaming, which allows shifting between the different quality levels during playback of the media content.

BRIEF DESCRIPTION OF THE DRAWINGS

The invention may be best understood by referring to the following description and accompanying drawings that are used to illustrate embodiments of the invention. In the drawings:

FIGS. 5A-5C are flow diagrams of one embodiment of generating content files with fixed-time video portions and full audio frames having codec-enforced frame sizes.

FIG. 6A is a diagrammatic representation of audio portions, video portions, and streamlets according to one embodiment of audio splitting.

DETAILED DESCRIPTION

Figure 1:
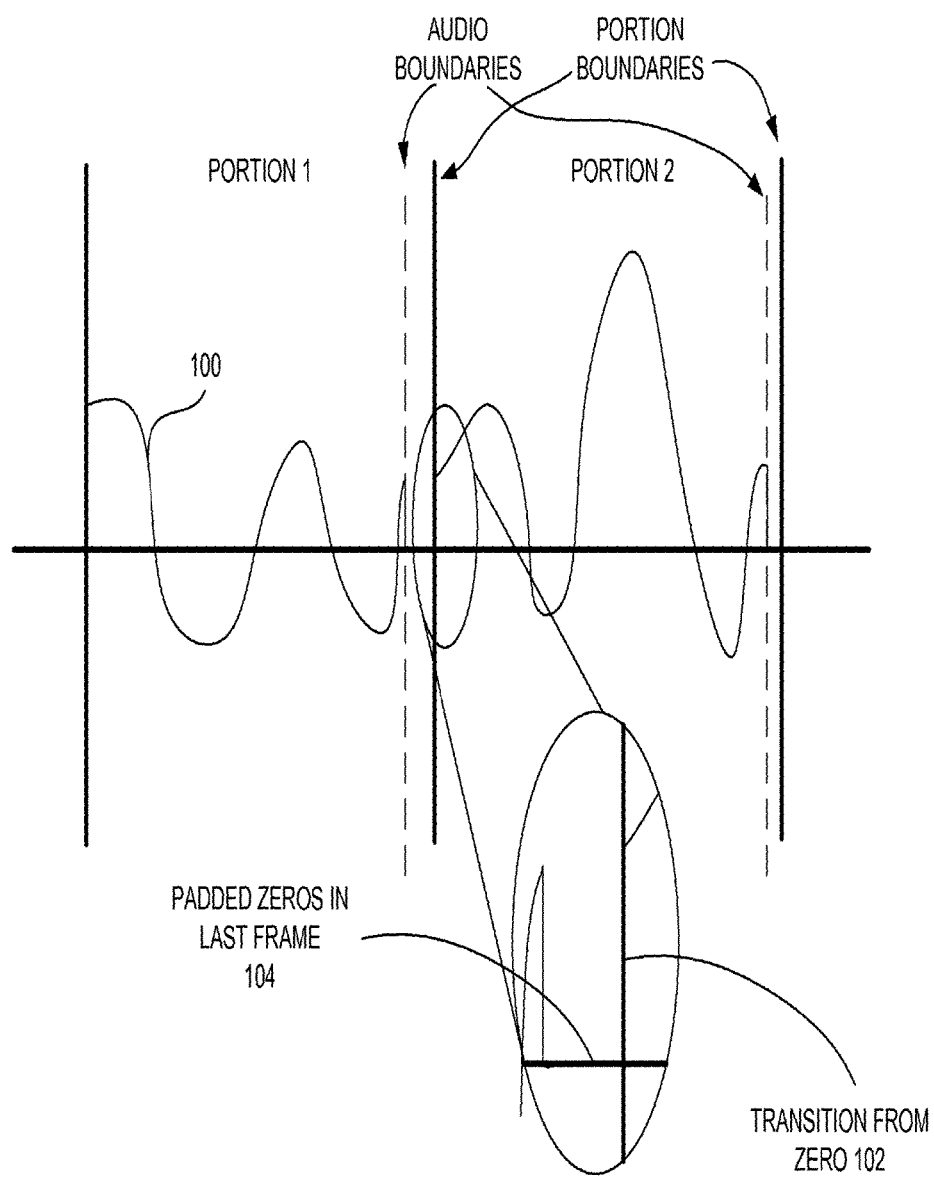
FIG. 1 is a diagram illustrating an exemplary audio waveform for two portions of audio using a conventional approach.

A method and apparatus for splitting the audio of media content into separate content files without introducing boundary artifacts is described. In one embodiment, a method, implemented by a computing system programmed to perform operations, includes receiving media content including audio and video, encoding the video according to a frame rate, encoding the audio according to a codec-enforced frame size (i.e., fixed frame size), and generating content files, each of the content files includes an encoded portion of the video having a fixed-time duration and an encoded portion of the audio having full audio frames having the codec-enforced frame size. In one embodiment, the last of the audio frames is not padded with zeros as done conventionally.

Embodiments of the present invention provide an improved approach to streaming audio. Unlike the conventional approaches that use a new encoding session for each portion of audio of the media content, the embodiments described herein allow the media content to be segmented into small portions without introducing boundary artifacts. The embodiments described herein segment the audio using full audio frames. When the audio is staged for playback, the audio is presented to the decoder as a single stream, rather than many small segments having boundary artifacts. In the embodiments described herein, the encoder becomes aware of the codec frame size (e.g., 1024 samples for AAC-LC or 2048 samples for HE AAC) and how many audio frames are produced with each invocation of the codec. The encoder storage as many audio frames that can fit into an encoded streamlet (i.e., a content file), which has a portion of the video based on a fixed-time duration. Rather than padding the last audio frame with zeros, a full frame of the next portion of audio is encoded and added to the current streamlet. This results in a small amount of audio that would otherwise be in the subsequent streamlet being written instead to the current streamlet. The subsequent streamlet is then given a time offset for the audio stream to indicate a gap, so that the audio can be presented to the decoder as a continuous stream when played back. This same amount of time is deducted from the target duration of the audio for this streamlet. If the end of the audio of this subsequent streamlet does not fall on a frame boundary, then audio is again borrowed from the subsequent streamlet to fill the final frame. This process repeats until the end of the stream of the media content is reached. The gaps inserted at the beginning of streamlets where audio is borrowed may be eliminated when the audio portions of the streamlets are staged prior to decode and playback. When seeking to a random streamlet, silent audio may played for the duration of the gap in order to maintain audio/video synchronization.

The embodiments of audio splitting as described herein provide the ability to encode the audio of the media content using audio codecs with large codec-enforced frame sizes (AAC, AC3, etc.) without introducing boundary artifacts while still maintaining the same fixed-time duration for the video.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "encoding," "generating," "splitting," "processing," "computing," "calculating," "determining," "displaying," or the like, refer to the actions and processes of a computer system, or similar electronic computing systems, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer system specifically programmed by a computer program stored in the computer system. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The term "encoded streamlet," as used herein, refers to a single encoded representation of a portion of the media content. Each streamlet may be an individual content file that includes a portion of the media, and may be encapsulated as an independent media object, allowing the streamlet to be cached individually and to be independently requestable and independently playable by a media player. These individual files are also referred to herein as QSS files. In one embodiment, a streamlet is a static file that can be served by a non-specialized server, instead of a specialized media server. In one embodiment, the media content in a streamlet may have a predetermined length of playback time (also referred to as the fixed-time duration). The predetermined length of time may be in the range of between about approximately 0.1 and 8.0 seconds, for example. Alternatively, other predetermined lengths may be used. The media content in the streamlet may have a unique time index in relation to the beginning of the media content contained in a stream. The filename may include part of the time index. Alternatively, the streamlets may be divided according to a file size, instead of a time index. The term "stream," as used herein, may refer to a collection of streamlets of the media content encoded by the same video quality profile, for example, portions of the video that have been encoded at the same video bit rate. The stream represents a copy of the original media content. The streamlets may be stored as separate files on any one or more of content servers, web servers, cache servers, proxy caches, or other devices on the network, such as found in a content delivery network (CDN). The separate files (e.g., streamlets) may be requested by the client device from the web server using HTTP. Using a standard protocol, such as HTTP, eliminates the need for network administrators to configure firewalls to recognize and pass through network traffic for a new, specialized protocol, such as Real Time Streaming Protocol (RTSP). Additionally, since the media player initiates the request, a web server, for example, is only required to retrieve and serve the requested streamlet, not the entire stream. The media player may also retrieve streamlets from more than one web server. These web servers may be without specialized server-side intelligence to retrieve the requested portions. In another embodiment, the streamlets are stored as separate files on a cache server of a network infrastructure operator (e.g., an ISP), or other components of a CDN. Although some of the present embodiments describe the use of streamlets, the embodiments described herein are not limited to use in computing systems that use streamlets, but may also be implemented in other systems that use other techniques for delivering live media content over the Internet. For example, in another embodiment, the media content is stored in a single file that is divided into portions that can be requested using HTTP range requests and cached in the CDN.

There are two general types of media streaming, namely push-based streaming and pull-based streaming. Push technology describes a method of Internet-based communication where the server, such as a publisher's content server, initiates the request for a given transaction. Pull technology, in contrast, describes a method of Internet-based communication where the request for transmission of information is initiated by the client device, and then is responded to by the server. One type of request in pull technology is a HTTP request (e.g., HTTP GET request). In contrast, in push-based technology, typically a specialized server uses specialized protocol, such as RTSP to push the data to the client device. Alternatively, some push-based technologies may use HTTP to deliver the media content. In pull-based technology, a CDN may be used to deliver the media to multiple client devices.

It should be noted that although various embodiments described herein are directed to a pull-based model, the embodiments may be implemented in other configurations, such as a push-based configuration. In the push-based configuration, the embodiments of audio splitting by the encoder can be done in a similar manner as the pull-based configuration described with respect to FIG. 2, and the encoded content file(s) can be stored on a content server, such as a media server to deliver the media content to the client device for playback using push-based technologies. It should also be noted that these embodiments can be used to provide different quality levels of the media content, and allow switching between the different quality levels, commonly referred to as adaptive streaming. One difference may be that, in the push-based model, the media server determines which content file(s) to send to the client device, whereas in the pull-based model, the client device determines which content file(s) to request from the content server.

Figure 2:
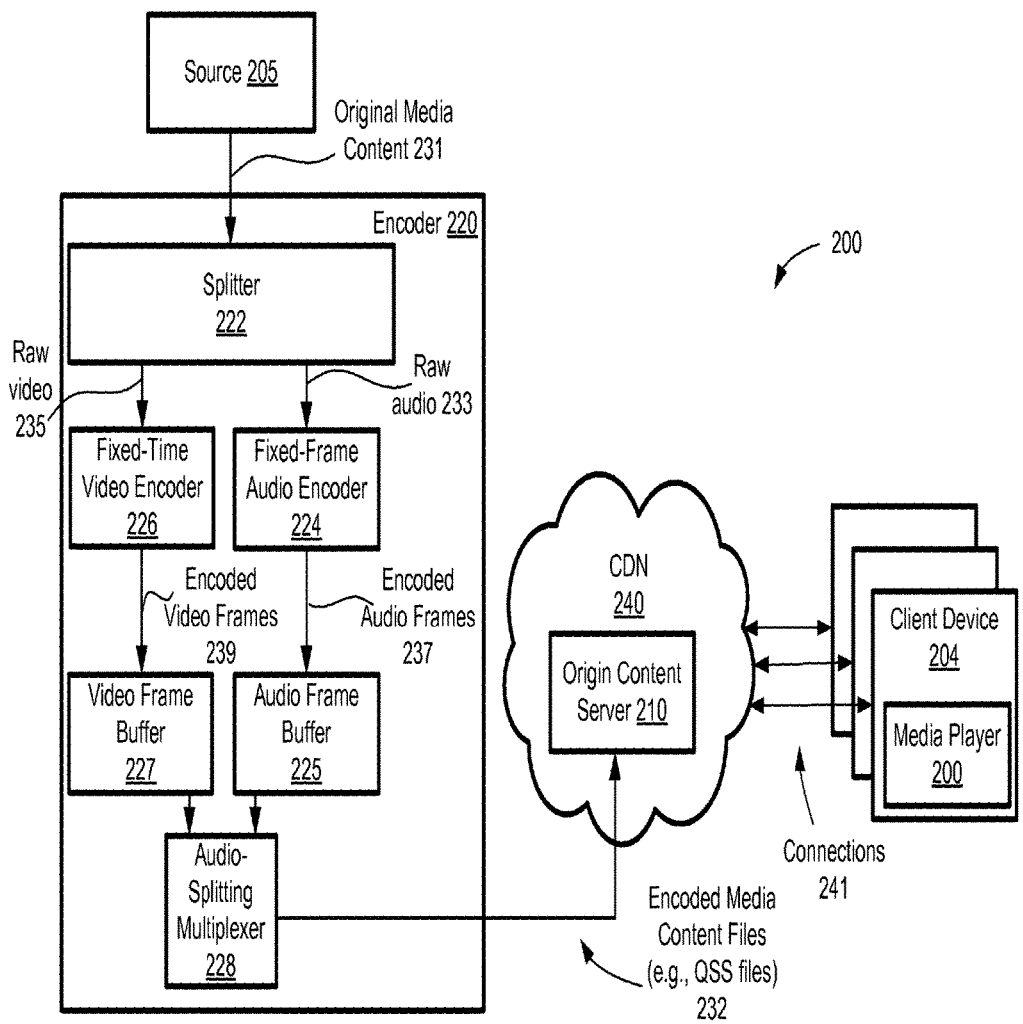
FIG. 2 is a schematic block diagram illustrating one embodiment of a computing environment in which an encoder of the present embodiments may be employed.

FIG. 2 is a schematic block diagram illustrating one embodiment of a computing environment 200 in which an encoder 220 of the present embodiments may be employed. The computing environment 200 includes a source 205, the encoder 220, an origin content server 210 (also referred to as a media server or origin server) of a content delivery network 240, and media players 200, each operating on a client device 204. The content server 210, encoder 220, and client devices 204 may be coupled by a data communications network. The data communications network may include the Internet. Alternatively, the content server 210, encoder 220, and client devices 204 may be located on a common Local Area Network (LAN), Personal area network (PAN), Campus Area Network (CAN), Metropolitan area network (MAN), Wide area network (WAN), wireless local area network, cellular network, virtual local area network, or the like. The client device 204 may be a client workstation, a server, a computer, a portable electronic device, an entertainment system configured to communicate over a network, such as a set-top box, a digital receiver, a digital television, or other electronic devices. For example, portable electronic devices may include, but are not limited to, cellular phones, portable gaming systems, portable computing devices, or the like. The client device 204 may have access to the Internet via a firewall, a router, or other packet switching devices.

In the depicted embodiment, the source 205 may be a publisher server or a publisher content repository. The source 205 may be a creator or distributor of media content. For example, if the media content to be streamed is a broadcast of a television program, the source 205 may be a server of a television or cable network channel such as the ABC® channel, or the MTV® channel. The publisher may transfer the media content over the Internet to the encoder 220, which may be configured to receive and process the media content and store the content file(s) of the media content in the origin content server 210. In one embodiment, the content server 210 delivers the media content to the client device 204, which is configured to play the content on a media player that is operating on the client device 204. The content server 210 delivers the media content by streaming the media content to the client device 204. In a further embodiment, the client device 204 is configured to receive different portions of the media content from multiple locations simultaneously or concurrently as described in more detail below.

Media content stored at the content server 210 may be replicated to other web servers; or alternatively, to proxy cache servers of the CDN 240. Replicating may occur by deliberate forwarding from the content server 210, or by a web, cache, or proxy server outside of the content server 210 asking for content on behalf of the client device 204. For example, the client device 204 may request and receive content from any of the multiple web servers, edge caches, or proxy cache servers. In the depicted embodiment, the web servers, proxy caches, edge caches, and content server 210 are organized in a hierarchy of the CDN 240 to deliver the media content to the client device 204. A CDN is a system of computers networked together across the Internet that cooperates transparently to deliver content, and may include, for example, one or more origin content servers, web servers, cache servers, edge servers, etc. Typically, the CDN is configured in a hierarchy so that a client device requests the data from an edge cache, for example, and if the edge cache does not contain the requested data, the request is sent to a parent cache, and so on up to the origin content server. The CDN may also include interconnected computer networks or nodes to deliver the media content. Some examples of CDNs would be CDNs developed by Akamai Technologies, Level3 Communications, or Limelight Networks. Alternatively, other types of CDNs may be used. In other embodiments, the origin content server 210 may deliver the media content to the client devices 204 using other configurations as would be appreciated by one of ordinary skill in the art having the benefit of this disclosure.

In one embodiment, the publisher stores the media content in an original content file to be distributed from the source 205. The content file may include data corresponding to video and/or audio corresponding to a television broadcast, sporting event, movie, music, concert, or the like. The original content file may include uncompressed video and audio; or alternatively, uncompressed video or audio. Alternatively, the content file may include compressed content (e.g., video and/or audio) using standard or proprietary encoding schemes. The original content file from the source 205 may be digital in form and may include media content having a high bit rate, such as, for example, approximately 5 Mbps or greater.

In the depicted embodiment, the encoder 220 receives the original media content 231 from the source 205, for example, by receiving an original content file, a signal from a direct feed of the live event broadcast, a stream of the live television event broadcast, or the like. The encoder 220 may be implemented on one or more machines including one or more server computers, gateways or other computing devices. In one embodiment, the encoder 220 receives the original media content 231 as one or more content files from a publishing system (not illustrated) (e.g., publisher's server or publisher's content repository). Alternatively, the encoder 220 receives the original media content 231 as it is captured. For example, the encoder 220 may receive a direct feed of the live television broadcast, such as a captured broadcast, in the form of a stream or a signal. The original media content 231 may be captured by a capture card, configured for television and/or video capture, such as, for example, the DRC-2600 capture card, available from Digital Rapids of Ontario, Canada. Alternatively, any capture card capable of capturing audio and video may be utilized with the present invention. The capture card may be located on the same server as the encoder; or alternatively, on a separate server. The original media content 231 may be a captured broadcast, such as broadcast that is being simultaneously broadcasted over the air, cable, and/or satellite, or a pre-recorded broadcast that is scheduled to be played at a specific point in time according to a schedule of a live event. The encoder 220 may utilize encoding schemes such as DivX® codec, Windows Media Video 9® series codec, Sorenson Video® 3 video codec, TrueMotion VP7 codec from On2 Technologies®, MPEG-4 video codecs, H.263 video codec, RealVideo 10 codec, OGG Vorbis, MP3, or the like. Alternatively, a custom encoding scheme may be employed.

In another embodiment, the encoder 220 receives the original media content 231 as portions of video and audio of fixed time durations, for example, two-second chunks (referred to herein as portions of the media content). The two-second chunks may include raw audio and raw video. Alternatively, the two-second chunks may be encoded audio and raw video. In such cases, the encoder 220 decompresses the media content. In another embodiment, the encoder 220 receives the original media content 221 as multiple raw streamlets, each raw streamlet containing a fixed-time portion of the media content (e.g., multiple two-second raw streamlets containing raw audio and video). As used herein, the term "raw streamlet" refers to a streamlet that is uncompressed or lightly compressed to substantially reduce size with no significant loss in quality. A lightly compressed raw streamlet can be transmitted more quickly. In another embodiment, the encoder 220 receives the original media content 231 as a stream or signal and segments the media content into fixed-time portions of the media content, such as raw streamlets.

In the depicted embodiment, the encoder 220 includes a splitter 222, a fixed-frame audio encoder 224, an audio frame buffer 225, a fixed-time video encoder 226, a video frame buffer 227, and an audio splitting multiplexer 228. The splitter 222 receives the original media content 231, for example, as a continuous stream of audio and video, and splits the media content 231 into raw audio 233 and raw video 235. In one embodiment, the fixed-frame audio encoder 224 is an audio codec. In one embodiment, the splitter 222 splits the continuous stream of audio and video into two-second chunks of audio and video. A codec (also referred to as compressor-decompressor or coder-decoder) is a device or computer program capable of encoding and/or decoding a digital data stream or signal. In one embodiment, the fixed-frame audio codec 224 is software executed by one or more computing devices of the encoder 220 to encode the raw audio 233. Alternatively, the fixed-frame audio codec 224 may be hardware logic used to encode the raw audio 233. In particular, the fixed-frame audio encoder 224 receives the raw audio 233 and encodes the audio according to a codec-enforced frame size, for example, 1024 samples for AAC-LC or 2048 samples for HE AAC. The fixed-frame audio encoder 224 outputs the encoded audio frames 237 to the audio frame buffer 225. Similarly, the fixed-time video encoder 226 receives the raw video 235 from the splitter 220, but encodes the video according to fixed-time durations, for example, 60 frames every two-second (30 frames per second (fps)). The fixed-time video encoder 226 outputs the encoded video frames 239 to the video frame buffer 227. In one embodiment, the fixed-time video codec 226 is software executed by one or more computing devices of the encoder 220 to encode the raw video 235. Alternatively, the fixed-time video codec 226 may be hardware logic used to encode the raw video 235.

The audio-splitting multiplexer 228 generates encoded media content files 232 (referred to herein as QSS files) using the encoded audio frames 237 and the encoded video frames 239. As described above, the conventional encoder generates a content file with a portion of video and a portion of audio, each being a fixed-time duration, where the last frame of audio is padded with zeros because the number of samples of the portion are not evenly divisible by the number of samples per frame according to the codec-enforced frame size used by the audio codec. Unlike the conventional encoder that pads the last frame, the audio-splitting multiplexer 228 uses full audio frames to generate content files that have a fixed-time video portion and an audio portion that has full audio frames having the codec-enforced frame sizes. Since the audio-splitting multiplexer 228 uses full audio frames to fill the content files 232, the audio-splitting multiplexer 228 does not pad the last few samples of the frame as zeros as done conventionally, but rather encodes a subsequent portion of the audio in order to add a full frame to the current content file 232.

In one embodiment, the audio-splitting multiplexer 228 tracks a sample offset that represents the amount of samples used from the subsequent portion in order to determine how many frames to use for the subsequent content file. The audio-splitting multiplexer 228 also tracks a presentation offset that indicates a gap in audio playback. Since samples that would have otherwise been played back as part of the subsequent content file are part of the current content file, the presentation offset of the subsequent content file indicates the gap in audio playback so that the audio portions of the current and subsequent content files are presented to the decoder as a continuous stream. In essence, during playback of the audio, the gaps inserted at the beginning of the content files may be eliminated when the audio portions of the content files are staged prior to decode and playback. The presentation offset allows the audio to be presented to the decoder as a continuous stream rather than many small segments having boundary artifacts. In one embodiment, when seeking to a random portion of the video, silent audio may be played for the duration of the gap in order to maintain audio/video synchronization.

In one embodiment, the audio-splitting multiplexer 228 generates a first content file by filling the first content file with a first video portion (e.g., 60 frames) having a fixed-time duration (e.g., 2 seconds), and a first audio portion having a number of buffered, full audio frames. The duration of the buffered audio frames is greater than the fixed-time duration.

In one embodiment, the audio-splitting multiplexer 228 generates the content files 232 by determining a number of encoded audio frames 237 needed to fill the current content file. In one embodiment, the number of frames is the smallest integer that is not less than a number of samples needed to fill the current content files divided by the codec-enforced frame size (e.g., samples per frame). In one embodiment, this number can be calculated using a ceiling function that maps a real number to the next largest integer, for example, ceiling(x)=[x] is the smallest integer not less than x. One example of the ceiling function is represented in the following equation (1):

$$\text{ceil}((\text{samplesPerStreamlet}-\text{offsetSamples})/\text{samplesPerFrame}) \quad (1)$$

Alternatively, other equations may be used.

The audio-splitting multiplexer 228 determines if there are enough of the encoded audio frames 237 in the audio frame buffer 225 to fill a current content file. If there are enough encoded frames buffered, the audio-splitting multiplexer 228 fills the current content file with the determined number of frames. If there are not enough encoded frames buffered, the audio-splitting multiplexer 228 waits until there are enough encoded frames stored in the buffer 225, and fills the current content file with the determined number of encoded frames stored in the buffer 225. In one embodiment, the audio-splitting multiplexer 228 determines if there is enough encoded frames buffered by 1) multiplying the number of buffered frames by the samples per frame, 2) adding a sample offset, if any, from a previous content file to the product of the multiplication, and 3) determining if the sum is greater than or equal to a number of samples needed to fill the current content file. One example of this operation is represented in the following equation (2):

$$\text{numBufferedFrames}*\text{samplesPerFrame}+ \text{offsetSamples} >= \text{samplesPerStreamlet} \quad (2)$$

The audio-splitting multiplexer 228 determines a sample offset, if any, for a subsequent content file. In one embodiment, the audio-splitting multiplexer 228 determines the sample offset by multiplying the number of the encoded frames by the codec-enforced frame size (i.e., samples per frame), minus the number of samples needed to fill the current content file and plus the sample offset, if any, from a previous content file. One example this operation is represented in the following equations (3) and (4):

$$\text{offestSamples}=\text{framesToSend}*\text{samplesPerFrame}- \text{samplesPerStreamlet}-\text{offsetSamples} \quad (3)$$

$$\text{where framesToSend}=\text{ceil}((\text{samplesPerStreamlet}- \text{offsetSamples})/\text{samplesPerFrame}) \quad (4)$$

In another embodiment, the audio-splitting multiplexer 228 generates the content files 221 by calculating a number of samples needed (e.g., 96,000) to fill a current content file. The audio-splitting multiplexer 228 calculates a number of frames (e.g., 93 frames for a 48K sampling rate for two second portions) needed for the current content file, and adds a frame to the number of frames (e.g., totaling 94 frames) when the number of samples divided by the samples per frame is not equally divisible. In effect this rounds up the number of frames to the next largest integer. The audio-splitting multiplexer 228 fills the current content file with the rounded number of frames.

In another embodiment, the audio-splitting multiplexer 228 generates the content files 221 by calculating a number of samples needed (e.g., 96,000) to fill a current content file by multiplying the sampling rate (e.g., 48K) by the duration of fixed-time duration (e.g., 2 sec). The audio-splitting multiplexer 228 calculates a number of frames needed for the current content file by dividing the number of samples by the codec-enforced frame size (e.g., 1024 samples per frame). If the remainder of the division is zero, the audio-splitting multiplexer 228 fills the current content file with the number of frames. However, if the remainder of the division is greater than zero, the audio-splitting multiplexer 228 increments the number of frames by one and fills the current content file with the incremented number of frames.

In a further embodiment, the audio-splitting multiplexer 228 generates the content files 221 by multiplying the number of frames by the codec-enforced frame size to convert back to the number of samples needed to fill the current content file, and calculating a duration of the audio of the current content file by dividing the number of samples by the sampling rate (e.g., StreamletDuration=samplesPerStreamlet/sampling rate). The audio-splitting multiplexer 228 determines a presentation offset for a subsequent content file by subtracting the duration from the fixed-time duration. The audio-splitting multiplexer 228 updates the sample offset for the subsequent content file by multiplying the number of frames by the codec-enforced frame size minus the number of samples used to fill the current content file and plus the sample offset, if any, from a previous content file (e.g., equation (3)).

Referring back to FIG. 2, in one embodiment, when the splitter 222 receives the original media content 231 as raw streamlets, the splitter 222 receives first and second raw streamlets and splits the audio and the video of the first and second raw streamlets. The fixed-time video encoder 226 encodes the video of the first and second raw streamlets, and audio-splitting multiplexer 228 stores the encoded video of the first raw streamlet in a first content file and the encoded video of the second raw streamlet in a second content file. The fixed-frame audio encoder 224 encodes the audio of the first raw streamlet into a first set of audio frames and stores the first set in the audio frame buffer 225. The audio-splitting multiplexer 228 determines if there are enough buffered frames to fill the first content file. If not, the fixed-frame audio encoder 224 encodes the audio of the second raw streamlet into a second set of audio frames and stores the second set in the audio frame buffer 225. When there are enough buffered frames (in some cases when one more full frame is stored in the buffer 225) to fill the first content file, the audio-splitting multiplexer 228 stores the buffered audio frames into the first content file. The encoder 220 continues this process until the media content ends.

Figure 6B:
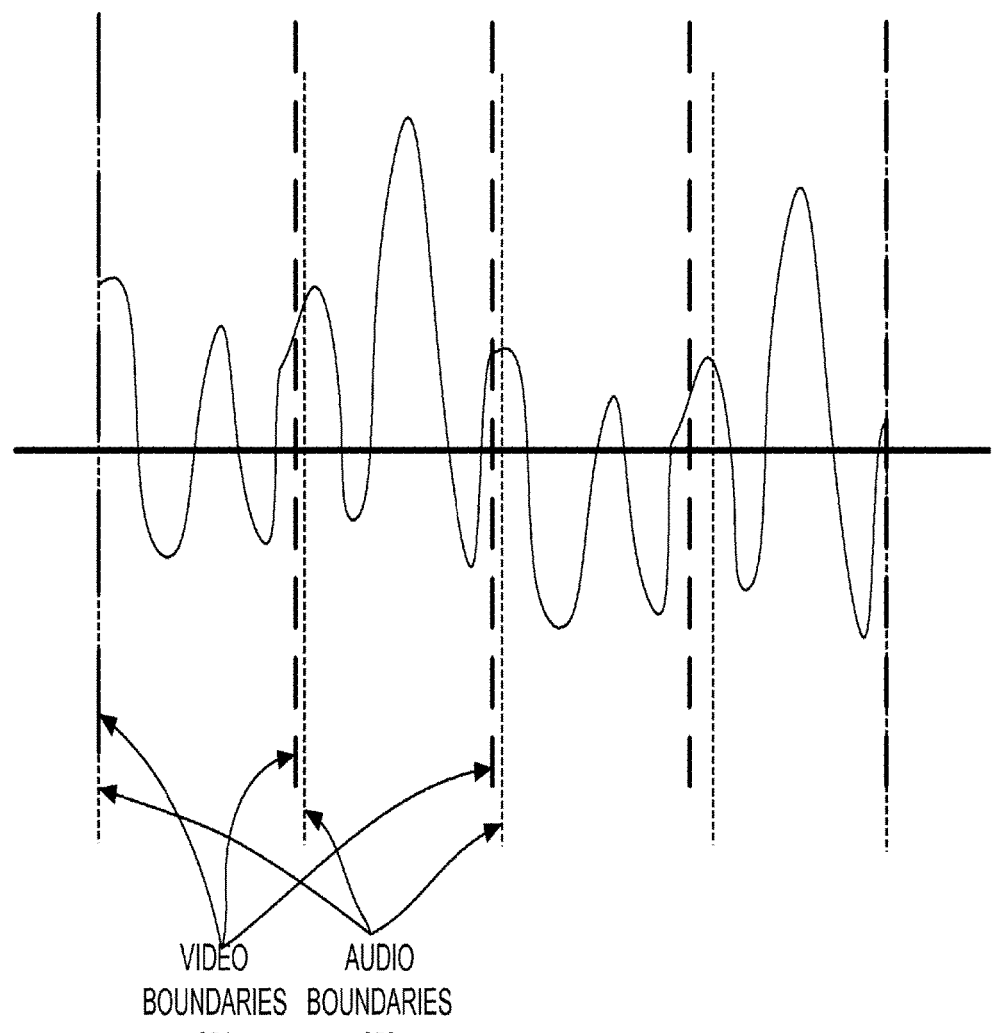
FIG. 6B is a diagram illustrating one embodiment of an audio waveform for four portions of audio using audio splitting.

Also, since the audio-splitting multiplexer 228 uses full audio frames, the audio frames in one content file 232 do not necessarily align with the video portion boundaries as illustrated in FIGS. 6A and 6B. For example, the duration of the audio portion of the content file 232 may be 2.0053 seconds, while the fixed-time duration of the video portion of the content file 232 may be 2.00 seconds. In this example, the codec-enforced frame size is 1024 samples per frame and the sampling rate of the audio is 48K, and there are 96256 samples of 94 frames stored in the audio portion stored in the content file 232. Since there is an extra 53 milliseconds (ms) in the content file 232, the audio-splitting multiplexer 228 gives the next content file a presentation offset of 53 ms because the current content file 232 uses samples having a duration of 53 ms that would have otherwise been in the next content file when using a fixed-time duration audio encoding scheme. The audio-splitting multiplexer 228 also tracks the sample offset to determine how many audio frames are needed to fill the next content file. In one embodiment, the audio-splitting multiplexer 228 fills each of the content files with one the encoded video portions having the fixed-time duration (e.g., 2 seconds for 60 video frames when the frame rate is 30 frames per second). The audio-splitting multiplexer 228 fills some of the content files with a number of buffered audio frames whose duration may be greater than the fixed-time duration, less than the fixed-time duration, or equal to the fixed-time duration, dependent upon whether the audio frames align with the video portion boundaries as determined by the audio-splitting multiplexer 228.

With reference to FIG. 6A, in one embodiment, the audio-splitting multiplexer 228 generates a first streamlet (i.e. content file) 601 by filling the first streamlet 601 with a first video portion 611, having approximately sixty video frames whose duration is equal to the fixed-time duration of two seconds, and with a first audio portion 621 having ninety-four audio frames, each having 1024 samples per frame, totaling 96, 256 samples. The duration of the first audio portion 621 is approximately 2.0053 seconds. The audio-splitting multiplexer 228 determines that the presentation offset of the first audio portion 631 of the first streamlet 603 is zero, since the audio and video boundaries 652 and 654 of the first streamlet 601 are aligned for playback.

The audio-splitting multiplexer 228 generates a second streamlet 602 by filling the second streamlet 602 with a second video portion 612 (60 frames and two seconds), and with a second audio portion 622 having ninety-four audio frames. The duration of the second audio portion 622 is approximately 2.0053 seconds. The audio-splitting multiplexer 228 determines that the presentation offset of the second audio portion 632 of the second streamlet 602 is approximately 5.3 milliseconds (ms), since the duration of the first audio portion 621 of the first streamlet 601 is approximately 2.0053 seconds. The presentation offset indicates a gap in the audio between the first and second streamlets 601 and 602. As shown in FIG. 6B, audio and video boundaries 652 and 654 of the second streamlet 602 are not aligned for playback. The presentation offset can be used to allow the audio portions of the first and second streamlets 601 and 602 to be staged for presentation to the decoder as a continuous stream.

The audio-splitting multiplexer 228 generates a third streamlet 603 by filling the third streamlet 603 with a third video portion 613 (60 frames and two seconds), and with a third audio portion 623 having ninety-four audio frames. The duration of the third audio portion 623 is approximately 2.0053 seconds. The audio-splitting multiplexer 228 determines that the presentation offset of the third audio portion 633 of the third streamlet 603 is approximately 10.66 ms, since the duration of the second audio portion 622 of the second streamlet 602 is approximately 2.0053 seconds. The presentation offset indicates a gap in the audio between the second and third streamlets 602 and 603. As shown in FIG. 6B, audio and video boundaries 652 and 654 of the third streamlet 603 are not aligned for playback. The presentation offset can be used to allow the audio portions of the second and third streamlets 602 and 603 to be staged for presentation to the decoder as a continuous stream.

The audio-splitting multiplexer 228 generates a fourth streamlet 604 by filling the fourth streamlet 604 with a fourth video portion 614 (60 frames and two seconds), and with a fourth audio portion 624 having ninety-three audio frames. The duration of the fourth audio portion 624 is approximately 1.984 seconds. The audio-splitting multiplexer 228 determines that the presentation offset of the fourth audio portion 634 of the fourth streamlet 604 is approximately 16 ms, since the duration of the third audio portion 623 of the third streamlet 603 is approximately 2.0053 seconds. The presentation offset indicates a gap in the audio between the third and fourth streamlets 603 and 604. As shown in FIG. 6B, audio and video boundaries 652 and 654 of the fourth streamlet 603 are not aligned for playback. The presentation offset can be used to allow the audio portions of the third and fourth streamlets 603 and 604 to be staged for presentation to the decoder as a continuous stream. After the fourth streamlet 604, however, the audio and video boundaries 652 and 654 are aligned, meaning the fifth streamlet (not illustrated) will have a presentation offset of zero. It should be noted that the embodiments of FIGS. 6A and 6B assume that the sampling rate is 48 kHz, the fixed-time duration is two seconds, and the codec-enforced frame size is 1024 samples per frame.

In the embodiments described above, the audio portions of the first three streamlets 601-603 have ninety-four audio frames, and the audio portion of a fourth streamlet 604 has ninety-three audio frames. In this embodiment, each of the video portions of the four content files 601-604 has approximately sixty video frames when the video is encoded at thirty frames per second. This pattern repeats until the end of the media content has been reached. It should be noted that in this embodiment, after every fourth content file, the presentation offset and sample offset are zero, meaning the audio boundaries 652 and video boundaries 654 align after every fourth content file.

As can be seen in FIG. 6B, after eight seconds of media content, the video and audio boundaries align. As such, another approach to decreasing boundary artifact frequency and to align AAC frame sizes would be to use eight seconds for the fixed-time duration. However, such approach has the following disadvantages: 1) This approach requires large chunk sizes of video, such as 8, 16, or 32 seconds. 2) This approach ties the implementation to a specific frame size, i.e., 1024 samples per frame. If the frame size were to change, such as to 2048, for example, this approach would have to switch to an audio codec with a different frame size, and would also have to change the chunk duration of the video. 3) This approach requires the audio sample rate to always be 48 kHz. Other common sample rates, such as 44.1 kHz, would require a different and potentially much larger chunk size. Alternatively, the source audio would have to be up-sampled to 48 kHz. The up-sampling, however, may introduce artifacts and may reduce the efficiency of the audio codec. The embodiments described herein, however, have the ability to encode using audio codec's with large frame sizes (AAC, AC3, etc.) without introducing chunk boundary artifacts while still maintaining the same chunk duration.

Alternatively, other sampling rates (e.g., 44.1 kHz), fixed-time durations (e.g., 0.1-5.0 seconds), video frame rates (e.g., 24 fps, 30 fps, etc.), and/or codec-enforced frame sizes (e.g., 2048) may be used. Different source videos use different frame rates. Most over-the-air signals in the U.S. are 30 frames per second (29.97, actually). Some HD signals are 60 frames per second (59.94). Some of the file-based content is 24 frames per second. In one embodiment, the encoder 220 does not increase the frame rate of the video because doing so would require the encoder 220 to generate additional frames. However, generating additional frames does not provide much benefit for this additional burden. So, for example, if the original media content has a frame rate of 24 fps, the encoder 220 uses a frame rate of 24 fps, instead of up-sampling to 30 fps. However, in some embodiments, the encoder 220 may down-sample the frame rate. For example, if the original media content has a frame rate of 60 fps, the encoder 220 may down-sample to 30 fps. This may be done because using 60 fps doubles the amount of data needed to be encoded at the target bit rate, which may make the quality suffer. In one embodiment, once the encoder 220 determines the frame rate that will be received or after down-sampling (generally 30 fps or 24 fps), the encoder 220 uses this frame rate for most of the quality profiles. Some of the quality profiles, such as the lowest quality profile, may use a lower frame rate. However, in other embodiments, the encoder 220 may use different frame rates for the different quality profiles, such as to target mobile phones and other devices with limited resources, such as less computational power. In these cases, it may be advantageous to have more profiles with lower frame rates.

It should be noted that when using other values for these parameters, the audio boundaries 652 and the video boundaries 654 may differ from the illustrated embodiment of FIG. 6B. For example, when using 44.1 kHz sampling rate, 1024 codec-enforced frame size and two seconds for the fixed-time duration, the audio portion of the first content file will have eighty-seven audio frames, and the second thru seventh content files will have eight-six audio frames. This pattern repeats itself until there is not enough video remaining in the media content. It should be noted that in this embodiment, after every 128 content files, the presentation offset and sample offset are zero, meaning the audio boundaries 652 and video boundaries 654 align after every 128$^{th}$ content file, as illustrated in the abbreviated Table 1-1.

TABLE 1-1

| Streamlet | offset | frames | samples |
|---|---|---|---|
| 1 | 0 | 87 | 89088 |
| 2 | 888 | 86 | 88064 |
| 3 | 752 | 86 | 88064 |

TABLE 1-1-continued

| Streamlet | offset | frames | samples |
|---|---|---|---|
| 4 | 616 | 86 | 88064 |
| 5 | 480 | 86 | 88064 |
| 6 | 344 | 86 | 88064 |
| 7 | 208 | 86 | 88064 |
| 8 | 72 | 87 | 89088 |
| 9 | 960 | 86 | 88064 |
| 10 | 824 | 86 | 88064 |
| 11 | 688 | 86 | 88064 |
| 12 | 552 | 86 | 88064 |
| 13 | 416 | 86 | 88064 |
| 14 | 280 | 86 | 88064 |
| 15 | 144 | 86 | 88064 |
| 16 | 8 | 87 | 89088 |
| 17 | 896 | 86 | 88064 |
| 18 | 760 | 86 | 88064 |
| 19 | 624 | 86 | 88064 |
| 20 | 488 | 86 | 88064 |
| ... | | | |
| 124 | 680 | 86 | 88064 |
| 125 | 544 | 86 | 88064 |
| 126 | 408 | 86 | 88064 |
| 127 | 272 | 86 | 88064 |
| 128 | 136 | 86 | 88064 |
| 129 | 0 | 87 | 89088 |

It should be noted that the sample offset in the above table is illustrated in units of samples, not seconds or milliseconds for ease of illustration. To convert the sample offset to the presentation offset, the sample offset can be divided by 44,100 to get the presentation offset in seconds, and multiplied by 1,000 to get the presentation offset in milliseconds. In one embodiment, the presentation offset in milliseconds can be stored in the streamlet header. Alternatively, the presentation offset or the sample offset can be stored in the streamlet header in other units.

In another embodiment, the audio-splitting multiplexer 228 generates the encoded content files 232 by filling each of the content files 232 with the encoded video frames 239 having a fixed-time duration (e.g., a fixed-time duration portion), and fills the content files 232 with a number of full audio frames 237 with the duration of the audio frames 237 being less than or greater than the fixed-time duration to accommodate the full audio frames being used in the content files 232. For example, a first content file can be filled with a portion of the video having the fixed-time duration, such as two seconds, and with an audio portion having multiple full audio frames having a duration that is greater than the fixed-time duration. Eventually, the sample offset will be big enough that less audio frames can be used, in which case the duration of the audio frames may be less than the fixed-time duration. At times, the audio boundary of the audio may match the video boundary of the video.

In another embodiment, the audio-splitting multiplexer 228 generates the encoded content files 232 by generating a first content file having the video frames of a first portion of video and audio frames from the first portion of the audio and an audio frame from a second portion. The audio-splitting multiplexer 228 generates a second content file having the video frames of a second portion of the video. For the audio, the audio-splitting multiplexer 228 determines if the audio boundary falls on the video boundary. If the audio boundary falls on the video boundary, the audio-splitting multiplexer 228 fills the second content file with the remaining audio frames of the second portion. However, if the audio boundary does not fall on the video boundary, the audio-splitting multiplexer 228 encodes an audio frame of a third portion of the media content, and fills the second content file with the remaining audio frames of the second portion and the audio frame from the third portion. This process repeats until the end of the media content is reached.

Referring back to FIG. 2, once the encoder 220 encodes the original media content 231, the encoder 220 sends the encoded media content files 232 to the origin content server 210, which delivers the encoded media content 232 to the media player 200 over the network connections 241. When a media player 200 receives the content files having the fixed-time duration of video and the variable-time duration of audio, the media player 200 uses the presentation offset of the content files to stage the audio to be presented to a decoder as a continuous stream, eliminating or reducing the pop or click noises presented by boundary artifacts. In essence, during playback of the audio, the media player 200 removes the gaps inserted at the beginning of the content files when the audio portions of the content files are staged prior to decode and playback. In another embodiment, if the audio splitting, as described herein, is not performed and the last frame is padded with zeros, the media player 200 may be configured to remove the padded samples of the last frame before sending the audio to the decoder. However, this approach may not be practical in certain situations, for example, when the media player is provided by a third-party or when access to the data of the audio frames after decoding is restricted.

It should be noted that, although one line has been illustrated for each media player 200, each line 241 may represent multiple network connections to the CDN 240. In one embodiment, each media player 200 may establish multiple Transport Control Protocol (TCP) connections to the CDN 240. In another embodiment, the media content is stored in multiple CDNs, for example, stored in the origin servers associated with each of the multiple CDN. The CDN 240 may be used for the purpose of improving performance, scalability, and cost efficiency to the end users (e.g., viewers) by reducing bandwidth costs and increasing global availability of content. CDNs may be implemented in various manners, and the details regarding their operation would be appreciated by one of ordinary skill in the art. As such, additional details regarding their operation have not been included. In other embodiments, other delivery techniques may be used to deliver the media content to the media players from the origin servers, such as peer-to-peer networks, or the like.

In the embodiments described above, the content files 232 represent one copy of the original media content stream 231. However, in other embodiments, each portion of the original media content 231 may be encoded into multiple encoded representation of the same portion of content. The multiple encoded representations may be encoded according to different quality profiles and stored as separate files that are independently requestable and independently playable by the client device 204. Each of the files may be stored in one or more content servers 210, on the web servers, proxy caches, edge caches of the CDN 240, and may be separately requested and delivered to the client device 204. In one embodiment, the encoder 220 simultaneously encodes the original content media 231 at several different quality levels, for example, ten or thirteen such levels. Each quality level is referred to as a quality profile or a profile. For example, if the media content has a one-hour duration and the media content is segmented into QSS files having two-second durations, there are 1800 QSS files for each encoded representation of the media content. If the media content is encoded according to ten different quality profiles, there are 18,000 QSS files for the media content. The quality profiles may indicate how the stream is to be encoded, for example, the quality profiles may specify parameters, such as width and height of the image (i.e., image size), video bit rate (i.e., rate at which the video is encoded), audio bit rate, audio sample rate (i.e., rate at which the audio is sampled when captured), number of audio tracks (e.g., mono, stereo, or the like), frame rate (e.g., frame per second), staging size, or the like. For example, the media players 200 may individually request different quality levels of the same media content 232; for example, each media player 200 may request the same portion (e.g., same time index) of the media content 232, but at different quality levels. For example, one media player may request a streamlet having HD quality video, since the computing device of the requesting media player has sufficient computational power and sufficient network bandwidth, while another media player may request a streamlet having a lower quality, since its computing device may not have sufficient network bandwidth, for example. In one embodiment, the media player 200 shifts between quality levels at the portion boundaries by requesting portions from different copies (e.g., different quality streams) of the media content, as described in U.S. Patent Application Publication No. 2005/0262257, filed Apr. 28, 2005. Alternatively, the media player 200 can request the portions using other techniques that would be appreciated by those of ordinary skill in the art having the benefit of this disclosure.

The encoder 220 may also specify which quality profiles are available for the particular portion of the media content, and may specify how much of the media content is available for delivery, for example, using a QMX file. The QMX file indicates the current duration of the media content represented by the available QSS files. The QMX file may operate as a table of contents for the media content, indicating which QSS files are available for delivery, and from where the QSS files can be retrieved. The QMX file may be sent to the media player 200 via the CDN 240, for example. Alternatively, the media player 200 can request the available quality profiles for the particular media content. In other embodiments, this configuration can be scaled using the scaling capabilities of CDNs to deliver HTTP traffic to multiple media players 200. For example, a data center that stores the encoded media content may have a cluster of origin content servers 210 to service multiple media players that request the encoded media content from the data center. Alternatively, other configurations may be used as would be appreciated by one of ordinary skill in the art having the benefit of this disclosure.

In one contemplated embodiment, the media player 200 requests portions of the media content by requesting individual streamlet files (e.g., QSS files). The media player 200 requests the QSS files according to a metadata descriptor file (e.g., QMX file). The media player 200 fetches a QMX file, for example, in response to a user selecting the media content for presentation, and the media player 200 reads the QMX file to determine when to start playback of the media content using the current duration, and where to request the QSS files. The QMX file includes a QMX timestamp, such as a UTC (Coordinated Universal Time) indicator, which indicates when the encoding process started (e.g., start time of the media content), and a current duration that indicates how much of the media content is available for delivery. For example, the QMX timestamp may indicate that the encoding process started at 6:00 pm (MDT), and 4,500 QSS files of the media content are available for delivery. The media player 200 can determine that the content duration (live playout) is approximately fifteen minutes, and decide to start requesting QSS files corresponding to the playback of the program at fifteen minutes into the program or slightly before that point. In one embodiment, the media player 200 can determine the point in the media content at which the media player 200 should start playing the content by fetching the corresponding streamlets at that offset into the media content. Each time the encoder stores another set of QSS files on the content server (e.g., set of ten QSS files representing the next two seconds of media content at the ten different quality profiles), the QMX file is updated, and the QMX file can be fetched by the media player 200 to indicate that two more seconds are available for delivery over the Internet. The media player 200 can periodically check for updated QMX files. Alternatively, the QMX file and any updates may be pushed to the media player 200 to indicate when the media content is available for delivery over the Internet.

It should be noted that although the origin content server 210 has been illustrated as being within the CDN 240, the origin content server 210 may reside outside of the CDN 240 and still be associated with the CDN 240. For example, one entity may own and operate the content server that stores the streamlets, but the CDN 240, whose devices may be owned and operated by one or more separate entities, delivers the streamlets.

It should be noted that the media content is data that when processed by a media player 200 (operating on an electronic device (i.e., client device)) allows the media player 200 to present a visual and/or audio representation of an event to a viewer of the media player 200. The media player 200 may be a piece of software that plays the media content (e.g., displays video and plays audio), and may be a standalone software application, a web browser plug-in, a combination of browser plug-in and supporting web page logic, or the like. For example, the event may be a television broadcast, such as of a sporting event, a live or recorded performance, a live or recorded news report, or the like. A live event or scheduled television event in this context refers to media content that is scheduled to be played back at a particular point in time, as dictated by a schedule. The live event may also have pre-recorded content intermingled with the live media content, such as slow-motion clips of important events within the live event (e.g., replays), which are played in between the live telecast. It should be noted that the embodiments described herein may also be used for streaming video-on-demand (VOD).

Figure 3A:
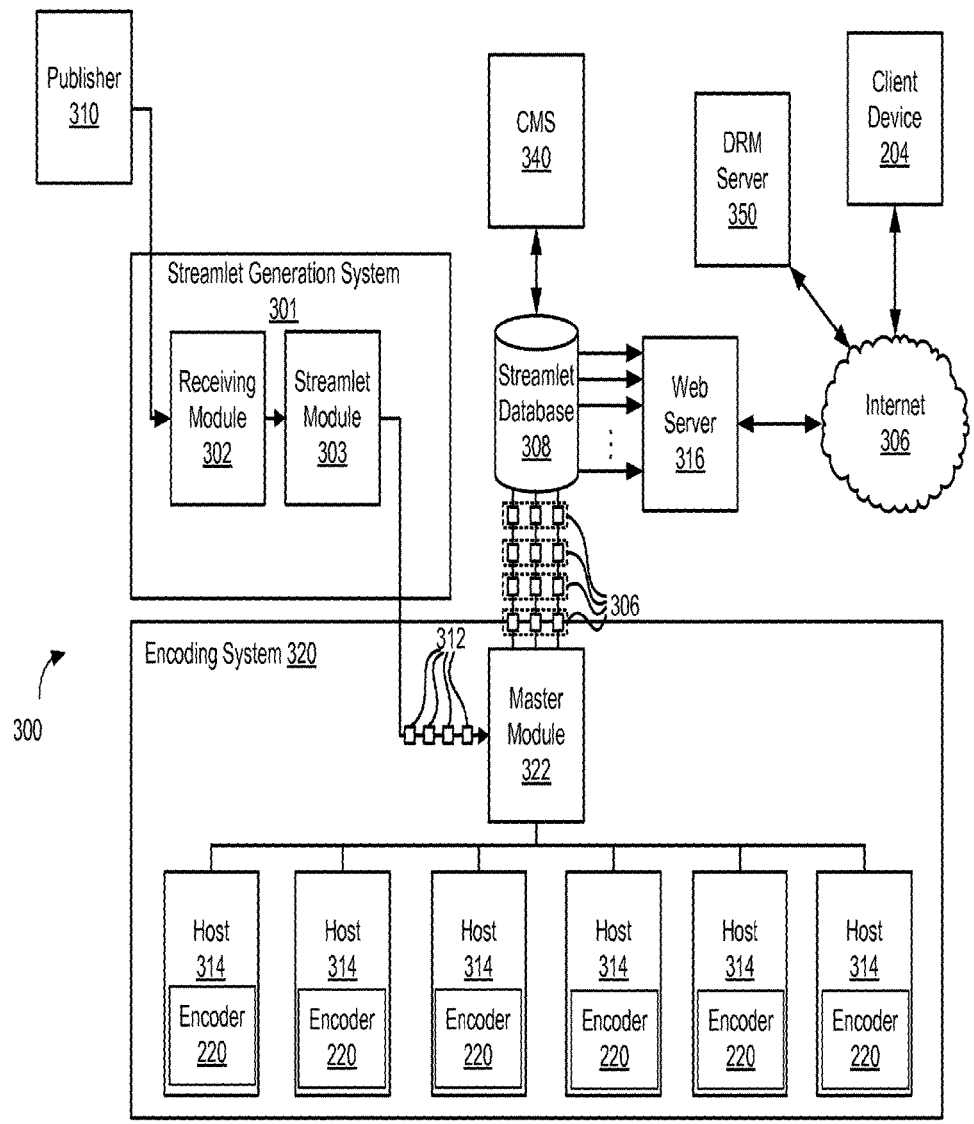
FIG. 3A is a schematic block diagram illustrating another embodiment of a computing environment in which an encoding system, including multiple hosts each employing the encoder of FIG. 2, may be employed.

FIG. 3A is a schematic block diagram illustrating another embodiment of a computing environment 300 in which an encoding system 320, including multiple hosts 314 each employing the encoder 220, may be employed. In one embodiment, the encoding system 320 includes a master module 322 and multiple host computing modules (hereinafter "host") 314. Each of the hosts 314 employ the encoder 220, as described above with respect to FIG. 2. The hosts 314 may be implemented on one or more personal computers, servers, etc. In a further embodiment, the hosts 314 may be dedicated hardware, for example, cards plugged into a single computer.

In one embodiment, the master module (hereinafter "master") 322 is configured to receive raw streamlets 312 from the streamlet generation system 301, which includes a receiving module 302 that receives the media content from a publisher 310, and a streamlet module 303 that segments the media content into raw streamlets 312. The master module 322 stages the raw streamlets 312 for processing. In another embodiment, the master 322 may receive source streamlets that are encoded and/or compressed and the master 322 decompress each source streamlet to produce a raw streamlet. As used herein, the term "raw streamlet" refers to a streamlet 312 that is uncompressed or lightly compressed to substantially reduce size with no significant loss in quality. A lightly compressed raw streamlet can be transmitted more quickly and to more hosts. Each host 314 is coupled with the master 322 and configured to receive a raw streamlet from the master 322 for encoding. The hosts 314, in one example, generate multiple streamlets having identical time indices and fixed-time durations, and varying bitrates. In one embodiment, each host 314 is configured to generate a set 306 of encoded streamlets from the raw streamlet 312 sent from the master 322, where the encoded streamlets of the set 306 represent the same portion of the media content at each of the supported bit rates (i.e., each streamlet is encoded according to one of the available quality profiles). Alternatively, each host 314 may be dedicated to producing a single encoded streamlet at one of the supported bit rates in order to reduce the time required for encoding.

Upon encoding completion, the host 314 returns the set 306 to the master 322 so that the encoding system 320 may store the set 306 in the streamlet database 308. The master 322 is further configured to assign encoding jobs to the hosts 314. In one embodiment, each host 314 is configured to submit an encoding job completion bid (hereinafter "bid") to the master 322. The master 322 assigns encoding jobs depending on the bids from the hosts 314. Each host 314 generates a bid depending upon multiple computing variables which may include, but are not limited to, current encoding job completion percentage, average job completion time, processor speed, physical memory capacity, or the like.

For example, a host 314 may submit a bid that indicates that the host 314 would be able to complete the encoding job in 15 seconds based on past performance history. The master 322 is configured to select from among the multiple bids the best bid and subsequently submit the encoding job to the host 314 with the best bid. As such, the described encoding system 320 does not require that each host 314 have identical hardware, but beneficially takes advantage of the available computing power of the hosts 314. Alternatively, the master 322 selects the host 314 based on a first come first serve basis, or some other algorithm deemed suitable for a particular encoding job.

The time required to encode one streamlet is dependent upon the computing power of the host 314, and the encoding requirements of the content file of the original media content. Examples of encoding requirements may include, but are not limited to, two or multi-pass encoding, and multiple streams of different bitrates. One benefit of the present invention is the ability to perform two-pass encoding on a live content file. Typically, in order to perform two-pass encoding prior art systems must wait for the content file to be completed before encoding. Streamlets, however, may be encoded as many times as is deemed necessary. Because the streamlet is an encapsulated media object of a small duration (e.g., 2 seconds), multi-pass encoding may begin on a live event once the first streamlet is captured.

In one embodiment, the encoder 220 segments the original content file into source streamlets and performs two-pass encoding of the multiple copies (e.g., streams) on each corresponding raw streamlet 312 without waiting for a TV show to end, for example. As such, the web server 316 is capable of streaming the streamlets over the Internet shortly after the streamlet generation system 301 begins capture of the original content file. The delay between a live broadcast transmitted from the publisher 310 and the availability of the content depends on the computing power of the hosts 314.

Figure 3B:
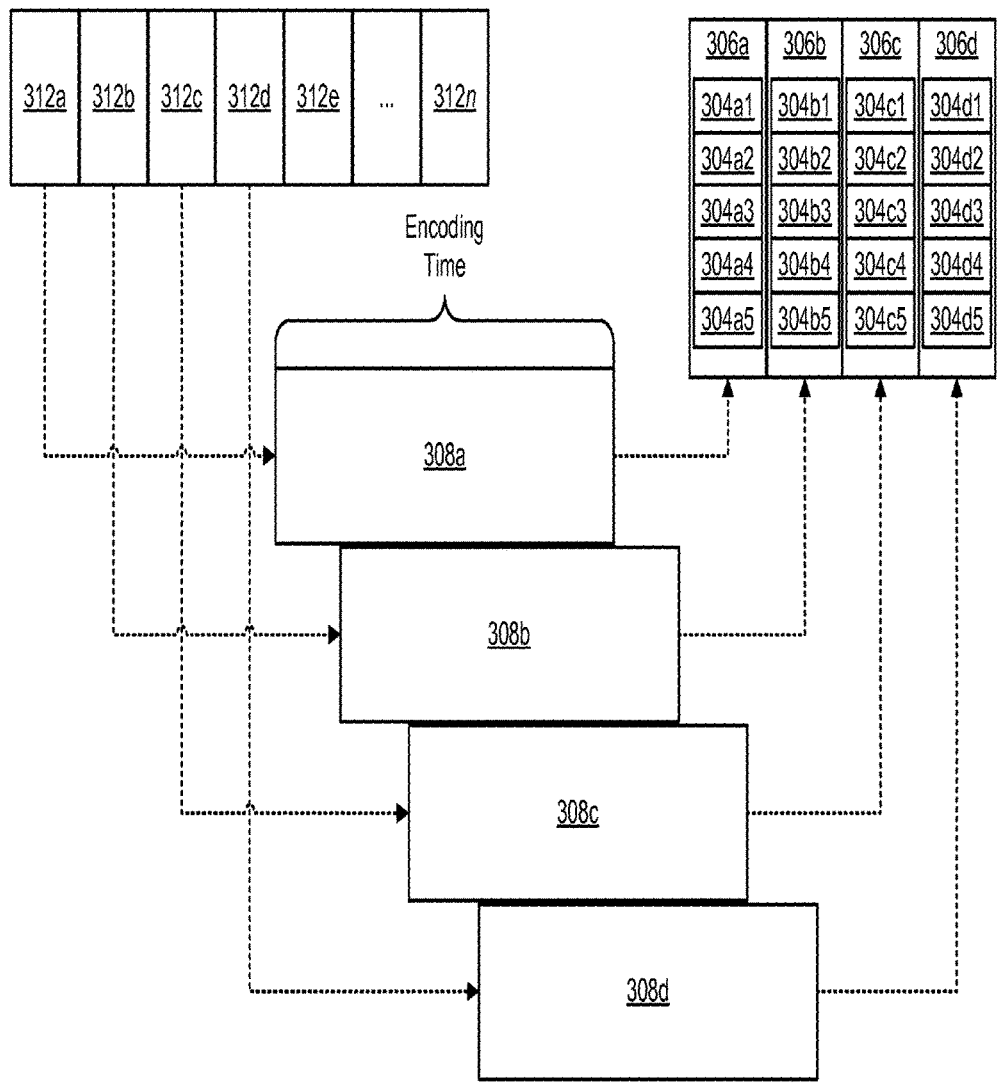
FIG. 3B is a schematic block diagram illustrating one embodiment of parallel encoding of streamlets according to one embodiment.

FIG. 3B is a schematic block diagram illustrating one embodiment of parallel encoding of streamlets 312 according to one embodiment. In one example, the streamlet generation system 301 begins to capture the original content file, generates a first streamlet 312a, and passes the streamlet to the encoding system 320. The encoding system 320 may take 10 seconds, for example, to generate the first set 306a of streamlets 304a (304a$_1$, 304a$_2$, 304a$_3$, etc. represent streamlets 304 of different bitrates). FIG. 3B illustrates the encoding process generically as block 308 to graphically illustrate the time duration required to process a raw or lightly encoded streamlet 312 as described above with reference to the encoding system 320. The encoding system 320 may simultaneously process more than one streamlet 312, and processing of streamlets will begin upon arrival of the streamlet from the streamlet generation module 301.

During the 10 seconds required to encode the first streamlet 312a, the streamlet module 404 has generated five additional 2-second streamlets 312b, 312c, 312d, 312e, 312f, for encoding and the master 322 has prepared and staged the corresponding raw streamlets. Two seconds after the first set 306a is available the next set 306b is available, and so on. As such, the original content file is encoded at different quality levels for streaming over the Internet and appears live. The 10-second delay is given herein by way of example only. Multiple hosts 314 may be added to the encoding system 320 in order to increase the processing capacity of the encoding system 320. The delay may be shortened to an almost unperceivable level by the addition of high CPU powered systems, or alternatively multiple low powered systems.

Any specific encoding scheme applied to a streamlet may take longer to complete than the time duration of the streamlet itself. For example, a very high quality encoding of a 2-second streamlet may take 5 seconds to finish. Alternatively, the processing time required for each streamlet may be less than the time duration of a streamlet. However, because the offset parallel encoding of successive streamlets are encoded by the encoding system 320 at regular intervals (matching the intervals at which the those streamlets are submitted to the encoding system 320, for example 2 seconds) the output timing of the encoding system 320 does not fall behind the real-time submission rate of the un-encoded streamlets 312.

Returning now to FIG. 3A, as depicted, the master 322 and the hosts 314 may be located within a single local area network, or in other terms, the hosts 314 may be in close physical proximity to the master 322. Alternatively, the hosts 314 may receive encoding jobs from the master 322 over the Internet or other communications network. For example, consider a live sports event in a remote location where it would be difficult to set up multiple hosts. In this example, a master performs no encoding or alternatively light encoding before publishing the streamlets online. The hosts 314 would then retrieve those streamlets and encode the streamlets into the multiple bit rate sets 306 as described above.

Furthermore, hosts 314 may be dynamically added or removed from the encoding system 320 without restarting the encoding job and/or interrupting the publishing of streamlets. If a host 314 experiences a crash or some failure, its encoding work is simply reassigned to another host.

The encoding system 320, in one embodiment, may also be configured to produce streamlets that are specific to a particular playback platform. For example, for a single raw streamlet, a single host 314 may produce streamlets for different quality levels for personal computer playback, streamlets for playback on cell phones with a different, proprietary codec, a small video-only streamlet for use when playing just a thumbnail view of the stream (like in a programming guide), and a very high quality streamlet for use in archiving.

In the depicted embodiment, the computing environment 300 includes a content management system (CMS) 340. The CMS 340 is a publishing system that manages the encoded media content 220, for example, using the streamlet database 308, and allows a publisher to generate and modify timelines (referred to herein as a virtual timeline (QVT)) to schedule the playback of the media content 232. The QVT is metadata that may define a play list for the viewer may indicate when the media players 200 should play the media content. For example, the timeline may specify a starting time of the media content 232, and a current duration of the media content 232 (e.g., amount of available portions of the media content available for delivery) to allow playback of the media event according to the schedule. In the example above, the encoders 220 update the CMS 240 with information about streams (e.g., copies of the media content 232) to indicate that certain portions (e.g., streamlets) of the stream have been sent to the origin content server 210 associated with the CDN 240. In this embodiment, the CMS 340 receives information from the encoder 220, such as, for example, any of the following: the encryption keys; availability information that indicates that the set of encoders 220 has sent portions of the encoded media content 232 to the origin content server 210; information that indicates what quality levels are available for a particular portion of the media content 232; metadata, including, for example, air date of the content, title, actresses, actors, a start index, an end index, proprietary publisher data, encryption level, content duration, episode or program name, publisher; available tools for the end-user navigational environment, such as available menus, thumbnails, sidebars, advertising, fast-forward, rewind, pause, and play, or the like; or bit-rate values, including frame size, audio channel information, codecs, sample rate, and frame parser information. Alternatively, the encoder 220 may send more or less information than the information described above.

In the depicted embodiment, the computing environment 300 includes a digital rights management server (DRM) 350 that provides digital rights management capability to the system. The DRM server 350 is further configured to supply encryption keys to the end user upon authenticating the end user. In one embodiment, the DRM server 350 is configured to authenticate a user based upon login credentials. One skilled in the art will recognize the various different ways the DRM server 350 may authenticate an end user, including, but not limited to encrypted cookies, user profile, geo-location, source website, etc.

In other embodiments, the computing environment 300 may include other devices, such as directory servers, management servers, messaging servers, statistic servers, devices of a network infrastructure operator (e.g., an ISP), or the like.

Figure 4:
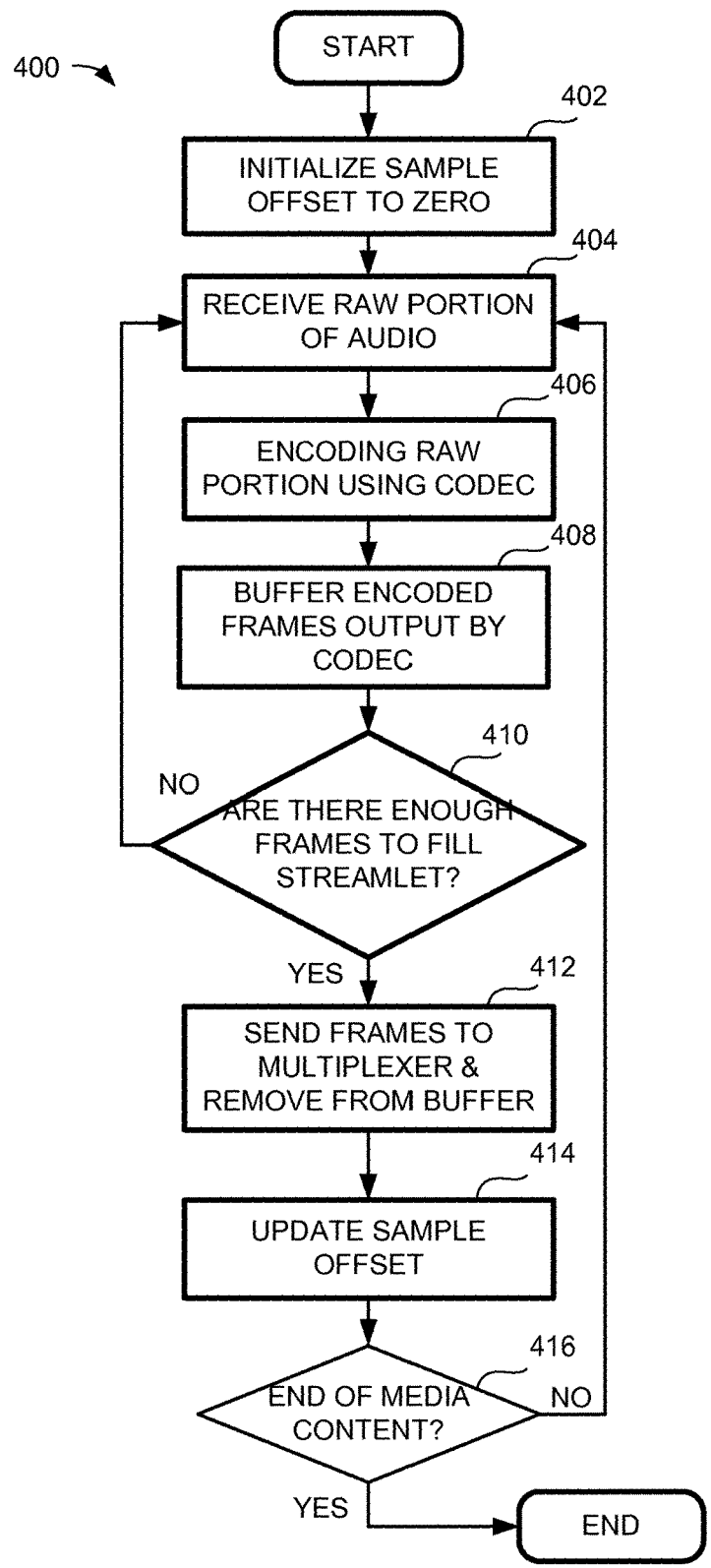
FIG. 4 is a flow diagram of one embodiment of a method of encoding audio of media content according to codec-enforced frame sizes for splitting full audio frames between content files having fixed-time video portion of the media content.

FIG. 4 is a flow diagram of one embodiment of a method 400 of encoding audio of media content according to codec-enforced frame sizes for splitting full audio frames between content files having fixed-time video portions of the media content. The method 400 is performed by processing logic that may include hardware (circuitry, dedicated logic, or the like), software (such as is run on a general purpose computer system or a dedicated machine), firmware (e.g., embedded software), or any combination thereof. In one embodiment, the method 400 is performed by the encoder 220 of FIGS. 2 and 3A. In another embodiment, some of the operations of the methods may be performed by the fixed-frame audio encoder 224 and the audio-splitting multiplexer 228 of FIG. 2.

In FIG. 4, processing logic starts by initializing sample offset to zero (block 402), and receives a raw portion of audio of the media content (block 404). The processing logic encodes the raw portion of audio using the fixed-frame audio codec (block 406) and buffers the encoded audio frames that are output by the audio codec (block 408). Processing logic determines if there are enough audio frames to fill a streamlet (block 410). In this embodiment, each streamlet also includes video frames whose duration is fixed, as described herein. If there are not enough audio frames to fill the streamlet, the processing logic returns to receive a subsequent raw portion of audio at block 404, encodes the raw portion of audio, and buffers the encoded audio frames at block 408. When the processing logic determines that there are enough audio frames to fill the streamlet at block 410, the processing logic sends the audio frames to the audio-splitting multiplexer and removes the sent frames from the buffer (block 412). The processing logic updates the sample offset (block 414), and determines if the media content is at the end (block 416). If the media content is not at the end at block 416, the processing logic returns to block 404 to receive another raw portion of audio. Otherwise, the method ends.

As described above with respect to FIG. 2, processing logic may be configured to perform the various operations of the components of the encoder 220. For example, the method 400 may be performed by the fixed-frame audio encoder 224, which receives the raw audio 233 from the splitter 222, encodes the audio frames, and stores the encoded audio frames 237 in the audio frame buffer 225. In this embodiment, the operations at block 402-408 may be performed by the fixed-frame audio encoder 224, while the operations at blocks 410-416 may be performed by audio-splitting multiplexer 228. Alternatively, the operations may be performed by other combination of components of the encoder 220.

FIGS. 5A-5C are flow diagrams of one embodiment of generating content files with fixed-time video portions and full audio frames having codec-enforced frame sizes. The methods 500, 550, and 570 are performed by processing logic that may include hardware (circuitry, dedicated logic, or the like), software (such as is run on a general purpose computer system or a dedicated machine), firmware (e.g., embedded software), or any combination thereof. In one embodiment, the methods 500, 550, and 570 are performed by the encoder 220 of FIGS. 2 and 3A. In another embodiment, the method 500 is performed by the fixed-frame audio encoder 224, the method 550 is performed by the fixed-time video encoder 226, and the method 570 is performed by the audio-splitting multiplexer 228. Alternatively, the operations of methods 500, 550, and 570 may be performed by other combination of components of the encoder 220.

In FIG. 5A, processing logic of method 500 starts by receiving a raw portion of audio (block 502). The processing logic encodes the raw portion of audio according to a codec-enforced frame size (block 504), and buffers the encoded audio frames (block 506). The processing logic determines if the media content is at the end (block 508). If the media content is not at the end at block 508, the processing logic returns to block 502 to receive another raw portion of audio. Otherwise, the method ends.

In FIG. 5B, processing logic of method 550 starts by receiving a raw portion of video (block 552). The processing logic encodes the raw portion of video according to a frame rate (block 554) and buffers the encoded video frames (block 556). The processing logic determines if the media content is at the end (block 558). If at block 558 the media content is not at the end, the processing logic returns to block 552 to receive another raw portion of video. Otherwise, the method ends.

In FIG. 5C, processing logic of method 570 starts by receiving encoded audio frames from the buffer (block 572) and receiving video frames from the buffer (block 574). The processing logic generates a streamlet (block 576) and sends the streamlet to the origin content server (block 578). The processing logic determines if the media content is at the end (block 580). If the media content is not at the end at block 580, the processing logic returns to block 572. Otherwise, the method ends.

In one embodiment, the processing logic at block 576 determines how many video frames are needed to fill the streamlet and how many audio frames are needed to fill the streamlet. In one embodiment, the number of video frames for each streamlet is roughly fixed according to the fixed-time duration. For example, if the frame rate is 30 fps, then there will be 60 frames in a two-second streamlet. It should be noted however that, in reality, the video is not always exactly 30 fps, but rather 29.97 fps. So, some two-second streamlets might have 59 frames, some might have 60, and some even with 61 frames. Each frame in a streamlet has a presentation time relative to the start of the streamlet. So, if a streamlet represents seconds 30-32, the first frame in that streamlet might have a presentation time of 6 ms, rather than 0. That frame would be displayed at 30006 ms from the start of the stream. In the case of live, if computing resources are limited and the encoder is unable to keep up with the live horizon, the encoder may drop frames in order to catch up. So, some streamlets may have gaps in the video, which may be another cause of variations in the number of frames per streamlet. Alternatively, other frame rates than 30 fps may be used, such as 24 fps or the like. The number of audio frames for each streamlet is not fixed. The number of audio frames is determined by the operations described above with respect to the audio-splitting multiplexer 228. The processing logic determines if there are enough full frames stored in the buffer to fill the current streamlet. If there are not enough audio frames, the processing logic receives and encodes a subsequent portion of the audio, for example, one full frame of audio from the subsequent portion as described herein. In some cases, the duration of the audio frames in a streamlet may be greater than the fixed-time duration, and in other cases the duration of the audio frames may be less than the fixed-time duration.

Figure 7:
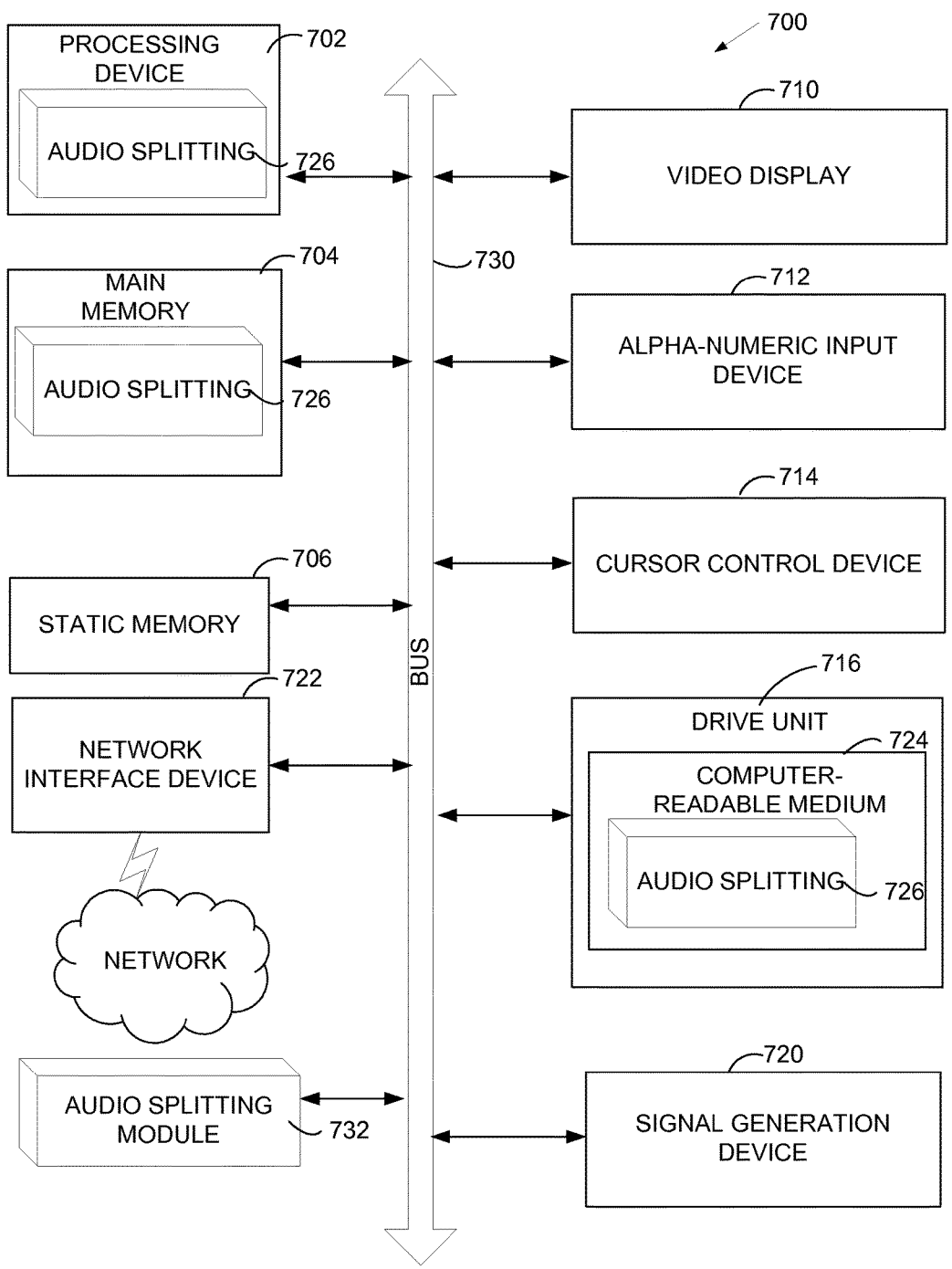
FIG. 7 illustrates a diagrammatic representation of a machine in the exemplary form of a computer system for audio splitting according to one embodiment.

FIG. 7 illustrates a diagrammatic representation of a machine in the exemplary form of a computer system 700 for audio splitting. Within the computer system 700 is a set of instructions for causing the machine to perform any one or more of the audio-splitting methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a STB, a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for operations of audio splitting, such as the methods 400, 500, 550, and 570 described above. In one embodiment, the computer system 700 represents various components that may be implemented in the encoder 220 or the encoding system 320 as described above. Alternatively, the encoder 220 or the encoding system 320 may include more or less components as illustrated in the computer system 700.

The exemplary computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 716, each of which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic (e.g., audio splitting 726) for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable storage medium 724 on which is stored one or more sets of instructions (e.g., audio splitting 726) embodying any one or more of the methodologies or functions described herein. The audio splitting 726 may also reside, completely or at least partially, within the main memory 704 and/or within the processing device 702 during execution thereof by the computer system 700, the main memory 704 and the processing device 702 also constituting computer-readable storage media. The audio splitting 726 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The audio splitting module 732, components, and other features described herein (for example in relation to FIGS. 2 and 3A) can be implemented as discrete hardware components or integrated in the functionality of hardware components such as ASICS, FPGAs, DSPs or similar devices. In addition, the audio splitting module 732 can be implemented as firmware or functional circuitry within hardware devices. Further, the audio splitting module 732 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A system comprising:
    a database to store media content including audio and video using a plurality of streamlets, wherein each of the plurality of streamlets comprises an encoded portion of the video encoded according to a frame rate and having a fixed-time duration and an encoded portion of the audio encoded according to a codec-enforced frame size and having a plurality of full audio frames having the codec-enforced frame size, wherein a duration of the encoded portion of the audio of one or more of the plurality of streamlets is greater than or less than the fixed-time duration; and
    a server coupled to the database to deliver the plurality of streamlets over one or more network connections.

2. The system of claim 1, wherein each streamlet of the plurality of streamlets is independently requestable by a media player.

3. The system of claim 2, wherein each streamlet of the plurality of streamlets is independently playable by the media player.

4. The system of claim 2, wherein each streamlet of the plurality of streamlets is independently requestable according to a time index of the respective streamlet.

5. The system of claim 1, wherein each streamlet of the plurality of streamlets is independently playable by a media player.

6. The system of claim 1, wherein each streamlet of the plurality of streamlets is independently requestable according to a time index of the respective streamlet.

7. The system of claim 1, wherein the plurality of streamlets can be requested using a range request.

8. The system of claim 7, wherein the range request comprises a Hypertext Transport Protocol (HTTP) range request.

9. The system of claim 1, wherein the media content is stored in the database in a single file that is divided into the plurality of streamlets.

10. The system of claim 9, further comprising an encoding system to receive the media content, generate the plurality of streamlets, and store the plurality of streamlets in the single file.

11. The system of claim 1, wherein the server delivers the plurality of streamlets using a Hypertext Transport Protocol (HTTP).

12. A system comprising:
 a database to store a plurality of segmented portions of media content including audio and video, wherein each of the plurality of segmented portions comprises an encoded portion of the video encoded according to a frame rate and having a fixed-time duration and an encoded portion of the audio encoded according to a codec-enforced frame size and having a plurality of full audio frames having the codec-enforced frame size, wherein a duration of the encoded portion of the audio of one or more of the plurality of segmented portions is greater than or less than the fixed-time duration; and
 a server coupled to the database to deliver the plurality of segmented portions over one or more network connections.

13. The system of claim 1, wherein each segmented portion of the plurality of segmented portions is independently requestable by a media player.

14. The system of claim 12, wherein each segmented portion of the plurality of segmented portions is independently playable by a media player.

15. The system of claim 12, wherein the plurality of segmented portions can be requested using a Hypertext Transport Protocol (HTTP) range request.

16. The system of claim 12, wherein the media content is stored in the database in a single file that is divided into the plurality of segmented portions.

17. The system of claim 16, further comprising an encoding system to receive the media content, divide the media content into the plurality of segmented portions, and store the plurality of segmented portions in the single file.

18. A method, implemented by a computing system programmed to perform operations, comprising:
 receiving, by a computing system, media content including audio and video;
 encoding, by the computing system, the video according to a frame rate;
 encoding, by the computing system, the audio according to a codec-enforced frame size;
 generating, by the computing system, a plurality of segmented portions of the media content, wherein each of the plurality of segmented portions comprises an encoded portion of the video having a fixed-time duration and an encoded portion of the audio having a plurality of full audio frames having the codec-enforced frame size, wherein a duration of the encoded portion of the audio of one or more of the plurality of content files is greater than or less than the fixed-time duration.

19. The method of claim 18, further comprising storing, by the computing system, the plurality of segmented portions in a single file.

20. A non-transitory computer-readable medium having instructions stored thereon that are executable by the computing system to perform the method of claim 18.

* * * * *